June 21, 1949.                    J. I. LONG                    2,473,757
                        DASH-CONTROLLED HYDRAULIC JACK
Filed Feb. 7, 1947                                        2 Sheets-Sheet 1
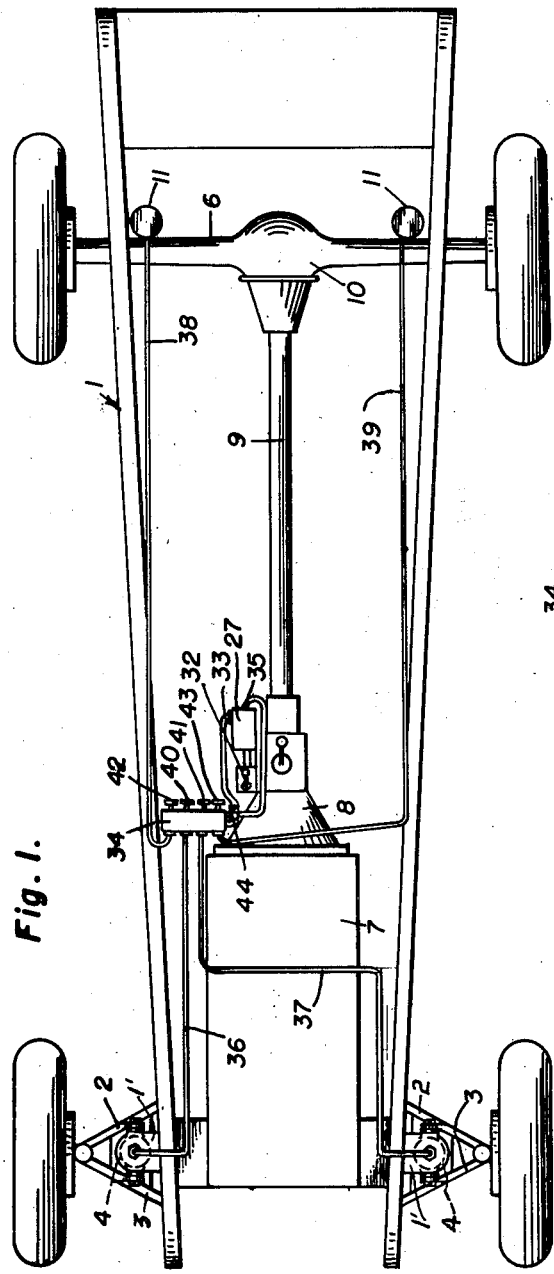
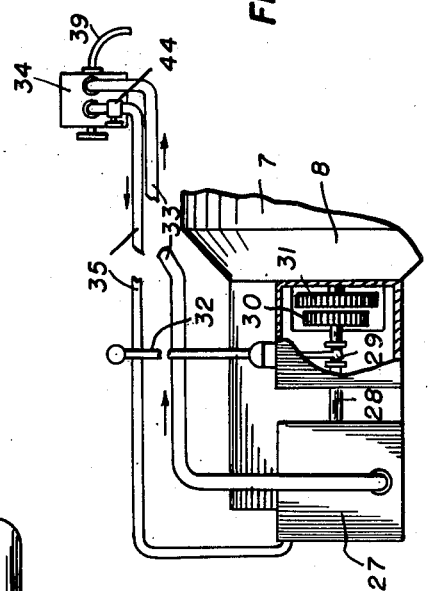
Inventor
James I. Long
By *Clarence A. O'Brien and Harvey B. Jacobson*
                                                    Attorneys June 21, 1949. J. I. LONG 2,473,757
DASH-CONTROLLED HYDRAULIC JACK
Filed Feb. 7, 1947 2 Sheets-Sheet 2

*Inventor*
James I. Long

By *Clarence A. O'Brien and Harvey B. Jacobson*
*Attorneys*

Patented June 21, 1949

2,473,757

UNITED STATES PATENT OFFICE 2,473,757

DASH-CONTROLLED HYDRAULIC JACK

James I. Long, Levy, Ark., assignor of twenty per cent to Glen Moody, twenty per cent to Anderson Jones, and twenty per cent to Samuel D. Gray, all of North Little Rock, Ark.

Application February 7, 1947, Serial No. 727,226

1 Claim. (Cl. 254—86)

This invention relates to improvements in dash-controlled hydraulic jacks for automobiles.

An object of the invention is to provide an improved dash-controlled hydraulic jack construction for automobiles including a plurality of hydraulic jacks mounted at the four corners of an automobile chassis, together with a combined fluid reservoir and pump being operatively connected with a gear driven power take-off from the automobile transmission, and valve controlled fluid carrying lines or pipes connected between said jacks and the combined fluid reservoir and pump.

Another object of the invention is to provide a dash-controlled transmission driven pump operated hydraulic jack construction for automobiles including hydraulic jacks attached to the four corners of an automobile chassis, together with valve controlled means on the automobile dash for lowering any selected jack or all of said jacks at one time to raise the automobile from the ground, and resilient means incorporated in each jack for automatically raising the same to its inoperative or idle position when desired.

A further object of the invention is to provide an improved dash-controlled hydraulic jack construction for automobiles which will include a safety relief or bleeder valve for preventing too great a pressure being built up in the jack system.

Another object of the invention is to provide an improved dash-controlled hydraulic jack for automobiles which will be highly efficient in operation, and relatively inexpensive to manufacture and produce.

Other objects will appear as the description proceeds.

In the accompanying drawings which form a part of this application:

Figure 1 is a plan view of an automobile chassis with the improved dash-controlled hydraulic jack mechanism applied thereto;

Figure 2 is a side elevation partly in section of the dash-controlled hydraulic jack mechanism and driving means therefor;

Like characters of reference are used throughout the following specification and the accompanying drawings to designate corresponding parts.

Figure 3:
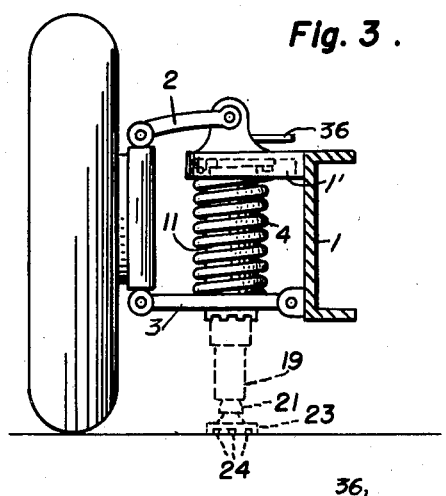
Figure 3 is a front elevation of a front wheel of an automobile with a hydraulic jack supported on the wheel suspension mechanism, with the jack shown in dotted lines in lowered position.
Figure 4:
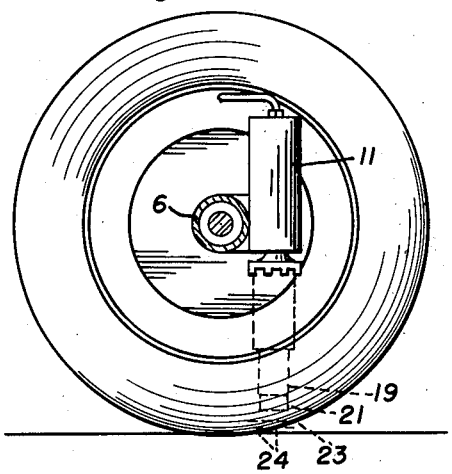
Figure 4 is a side elevation of the hydraulic jack shown in raised position and shown in dotted lines in lowered position.
Figure 5:
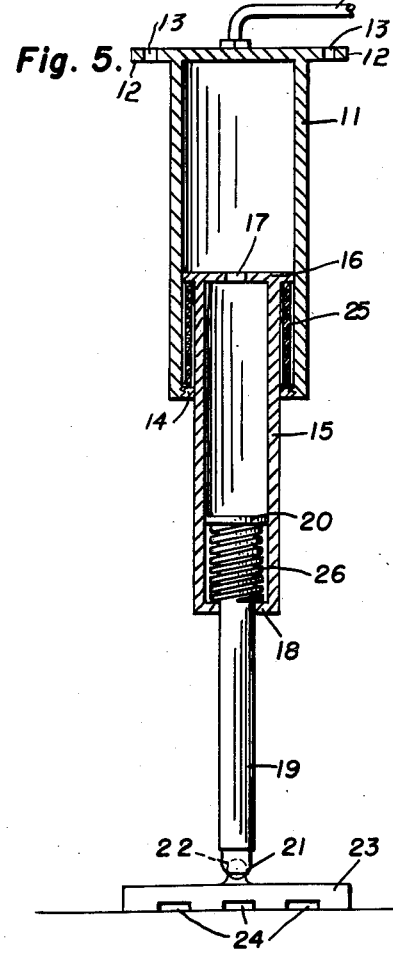
Figure 5 is a vertical sectional view through one of the hydraulic jacks shown in lowered or extended position.
Figure 6:
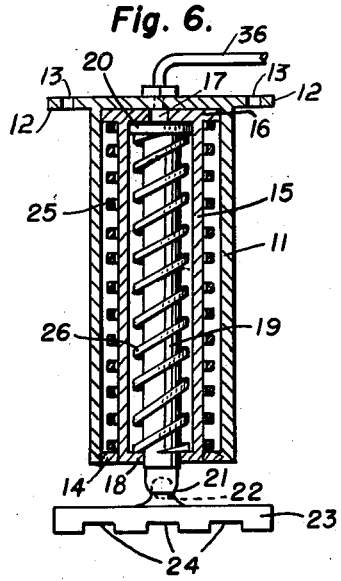
Figure 6 is a vertical sectional view through one of the hydraulic jacks shown in idle or raised position.

In carrying out the invention, there is provided an automobile chassis generally designated by the reference numeral 1 including front wheel suspension means comprising extending portions 1' of the chassis and frames including upper link means 2 and lower link means 3 each pivotally attached to the front end of said chassis as illustrated best in Fig. 3, and having heavy coil springs 4 and 5 secured under compression between the lower link means 3 and the extending portions 1', and a rear axle housing 6. It will be understood that the lower link means will be bifurcated or centrally apertured if of plate type according to conventional practice.

An engine 7 is provided with the usual transmission 8 and propeller shaft 9 connected between the same and the differential housing 10.

Four similarly formed hydraulic jack cylinders 11 are suitably attached to the front wheel suspension means and to the opposite ends of the rear axle housing 6, preferably by means of the supporting flanges 12 which are apertured at 13 to receive suitable fastening bolts or the like (not shown), the flanges 13 being secured to the extending portions 1' at the front end of the chassis so that the cylinders depend coaxially within the springs 4.

The cylinders 11 are open at their lower ends except for the inwardly directed annular stop flanges 14 formed as continuations of the supporting base flanges 12, and receive the vertically movable barrels or cylinders 15 of lesser overall width than the inner diameter of said cylinders 11, said barrels or cylinders 15 being formed with the flanged closure heads 16 which fit snugly within said cylinders 11. The barrels or cylinders 15 are prevented from separation from the cylinders 11 by means of the flanged closure heads 16 engaging the annular stop flanges 14 at the lower ends of the cylinders 11 when said cylinders 15 are in fully lowered to extended position. Centrally disposed apertures 17 are formed through the heads of the barrels or cylinders 15, while the lower ends thereof are partially closed by the integral inwardly extending annular flanges 18.

The rods 19 are slidably disposed through said flanges 18 for reciprocating movement in the barrels or cylinders 15 and support the heads 20 on their upper ends for slidable contact with the inner walls of said barrels or cylinders 15.

Sockets 21 are formed on the lower ends of the rods 19 and cooperate with the ball heads 22 on the ground engaging foot plates 23, forming universal joint connections between said rods and said foot plates.

The lower surfaces of the ground engaging feet or supporting plates 23 are grooved or otherwise roughened as at 24 to prevent slipping of the plates when in contact with the ground.

Heavy coil springs 25 and 26 are mounted respectively between each of the cylinders 11 and the interiorly disposed cylinders 15, and also between the cylinders 15 and the foot plate supporting rods for resiliently urging and retracting said plates to their retracted or idle positions after the hydraulic fluid has been exhausted from the said cylinders.

A combined fluid reservoir and pump is designated by the reference numeral 27, and is supported in any desired manner adjacent to the automobile transmission, said pump being driven by a shaft 28 connected through the clutch 29 to the power take-off driving gears 30 and 31, which are, in turn, connected with the transmission gears (not shown) of the automobile transmission 8. A clutch control or operating lever 32 is connected with the clutch 29 for engaging the pump drive mechanism when the hydraulic jacks are to be lowered for lifting the automobile from the ground.

A fluid discharge pipe 33 will be connected from the combined reservoir and pump 27 to lead the fluid to the valve control casing or housing 34 mounted upon the dash (not shown) of the automobile, and a return pipe 35 will lead the fluid back from the casing or housing 34 to said reservoir and pump 27.

The valve control casing or housing 34 will be connected by the four pipes or tubes 36, 37, 38 and 39 to the upper ends of the four cylinders 11 for forcing the liquid or fluid from said reservoir and pump 2 and through the casing or housing 34 to said cylinders 11 and through the central apertures or ports 17 in the inner ends of the cylinders or barrels 15, to force the same to their extended position and to simultaneously force the rods to their extended position until their foot plates engage the ground, thereby raising the automobile from its contact with the ground, simultaneously depressing the coil springs 25 and 30. Control valves 40, 41, 42 and 43 will be operable in the casing or housing 34 to control and cut off the flow of fluid to and through said pipes 36, 37, 38 and 39 to the hydraulic jack cylinders 11.

After a jack or jacks have been operated, the fluid pump will be stopped and the valve or valves to the jack or jacks will be opened to permit the fluid from the jacks to flow back into the reservoir and pump 27.

A safety or bleeder valve 44 will be disposed in the return line or pipe 35 to automatically open should the pressure be built up beyond the desired amount, thereby preventing the bursting of any of the parts of the system. If the bleeder 44 is opened while the pump is in operation and the control valves are all closed, the fluid will merely be pumped or churned to by-pass the hydraulic jacks.

From the foregoing description, it will be seen that there has been devised and provided a highly efficient form of dash-controlled hydraulic jack mechanism which will be positive in action and relatively inexpensive to manufacture and produce.

While a preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

The combination in a vehicle chassis having coil spring wheel suspension means, comprising a substantially vertical coiled suspension spring, a portion of the chassis bearing upon the upper end of said spring, a hydraulic jack having a cylinder disposed coaxially of said spring and secured to said portion, said jack having extensible elements operatively associated with said cylinder whereby the jack may be collapsed upwardly substantially completely within said spring to maintain normal road clearance.

JAMES I. LONG.

REFERENCES CITED

The following references are of record in the file of this patent:

UNITED STATES PATENTS

| Number | Name | Date |
|---|---|---|
| 2,257,324 | Behm | Sept. 30, 1941 |
| 2,330,974 | Hoo | Oct. 5, 1943 |
| 2,343,937 | Smith | Mar. 14, 1944 |